(12) United States Patent  
Spurlock et al.

(10) Patent No.: US 8,327,439 B2  
(45) Date of Patent: *Dec. 4, 2012

(54) SYSTEM, METHOD AND COMPUTER PROGRAM PRODUCT FOR IDENTIFYING FUNCTIONS IN COMPUTER CODE THAT CONTROL A BEHAVIOR THEREOF WHEN EXECUTED

(75) Inventors: Joel Robert Spurlock, Newberg, OR (US); Aditya Kapoor, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,030

(22) Filed: Jul. 11, 2011

(65) Prior Publication Data

US 2011/0271346 A1    Nov. 3, 2011

Related U.S. Application Data

(63) Continuation of application No. 11/432,648, filed on May 10, 2006, now Pat. No. 8,001,595.

(51) Int. Cl.  
*G06F 12/14* (2006.01)

(52) U.S. Cl. .......................................... 726/22; 713/188

(58) Field of Classification Search .................... 726/24; 717/131, 127  
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,119,236 A | 9/2000 | Shipley |
| 6,460,050 B1 | 10/2002 | Pace et al. |
| 6,873,935 B2 | 3/2005 | Spinrad et al. |
| 6,980,992 B1 | 12/2005 | Hursey et al. |
| 7,506,155 B1 | 3/2009 | Stewart et al. |
| 8,001,595 B1 * | 8/2011 | Spurlock et al. ................ 726/22 |
| 2003/0101381 A1 | 5/2003 | Mateev et al. |
| 2004/0111708 A1 | 6/2004 | Calder et al. |
| 2005/0060295 A1 | 3/2005 | Gould et al. |
| 2005/0108562 A1 | 5/2005 | Khazan et al. |
| 2005/0198649 A1 | 9/2005 | Zakonov |
| 2006/0230453 A1 * | 10/2006 | Flynn et al. ..................... 726/24 |
| 2007/0083933 A1 | 4/2007 | Venkatapathy et al. |
| 2007/0113282 A1 | 5/2007 | Ross |

OTHER PUBLICATIONS

Flake, Halvar, "Automated Reverse Engineering," Black Hat Windows 2004 (79 pages).

Carrera, Ero et al., "Digital Genome Mapping-Advanced Binary Malware Analysis," Virus Bulletin Conference, Sep. 2004 (11 pages).

Sabin, Todd, "BindView Razor Team," Symantec, http://www.bindview.com/Services/Razor/Papers/2004/comparing_binaries.cfm (22 pages).

Xu, et al., Safety Checking of Machine Code, Computer Sciences Department, University of Wisconsin, copyright 2000 (13 pages).

* cited by examiner

*Primary Examiner* — Matthew Smithers  
(74) *Attorney, Agent, or Firm* — Patent Capital Group (57) ABSTRACT

A security data structure, method and computer program product are provided. In use, computer code is received. Furthermore, functions in the computer code that control a behavior of the computer code when executed are statically identified.

19 Claims, 7 Drawing Sheets

SYSTEM, METHOD AND COMPUTER PROGRAM PRODUCT FOR IDENTIFYING FUNCTIONS IN COMPUTER CODE THAT CONTROL A BEHAVIOR THEREOF WHEN EXECUTED

RELATED APPLICATION

This application is a continuation (and claims the benefit of priority under 35 U.S.C. §120) of U.S. application Ser. No. 11/432,648, filed May 10, 2006, entitled "SYSTEM, METHOD AND COMPUTER PROGRAM PRODUCT FOR IDENTIFYING FUNCTIONS IN COMPUTER CODE THAT CONTROL A BEHAVIOR THEREOF WHEN EXECUTED," Inventor(s) Joel Robert Spurlock, et al., issued as U.S. Pat. No. 8,001,595 on Aug. 16, 2011. The disclosure of the prior application is considered part of (and is incorporated by reference in) the disclosure of this application.

FIELD OF THE INVENTION

The present invention relates to security applications, and more particularly to identifying undesirable code.

BACKGROUND

Increasingly, computer systems have needed to protect themselves against undesirable computer code. Such undesirable computer code has generally taken the form of viruses, worms, Trojan horses, spyware, adware, rootkits, and so forth. The damage and/or inconvenience capable of being incurred by these types of undesirable code has ranged from mild interference with a program, such as the display of an unwanted political message in a dialog box, to the complete destruction of contents on a hard drive, and even the theft of personal information.

Many mechanisms have been created in order to provide the much needed protection from such undesirable computer code and/or the affects thereof. Such mechanisms generally include detection applications, such as scanners, which scan for and clean undesirable computer code, and firewalls, which block undesirable computer code.

Current detection technology is predominantly based on finding patterns in computer code. However, such computer code is vulnerable to structural modifications. Thus, in order to circumvent the aforementioned detection technology, authors of undesirable computer code need only use techniques such as instruction reordering, junk data insertion, code obfuscation, etc. Such circumventing techniques change the computer code structurally while preserving any semantics, thus making the undesirable computer code difficult to detect.

There is thus a need for overcoming these and/or other problems associated with the prior art.

SUMMARY

A security data structure, method and computer program product are provided. In use, computer code is received. Furthermore, functions in the computer code that control a behavior of the computer code when executed are statically identified.

DETAILED DESCRIPTION

Figure 1:
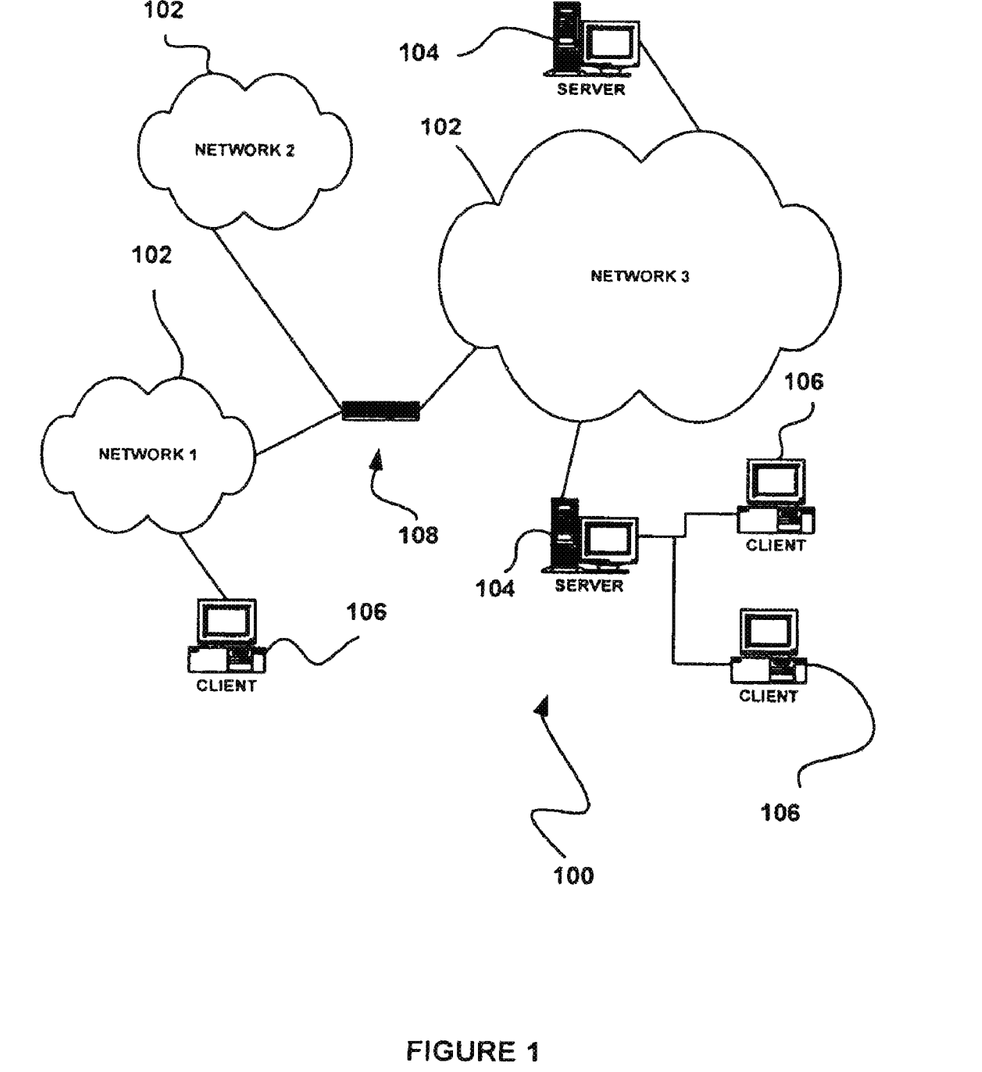
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
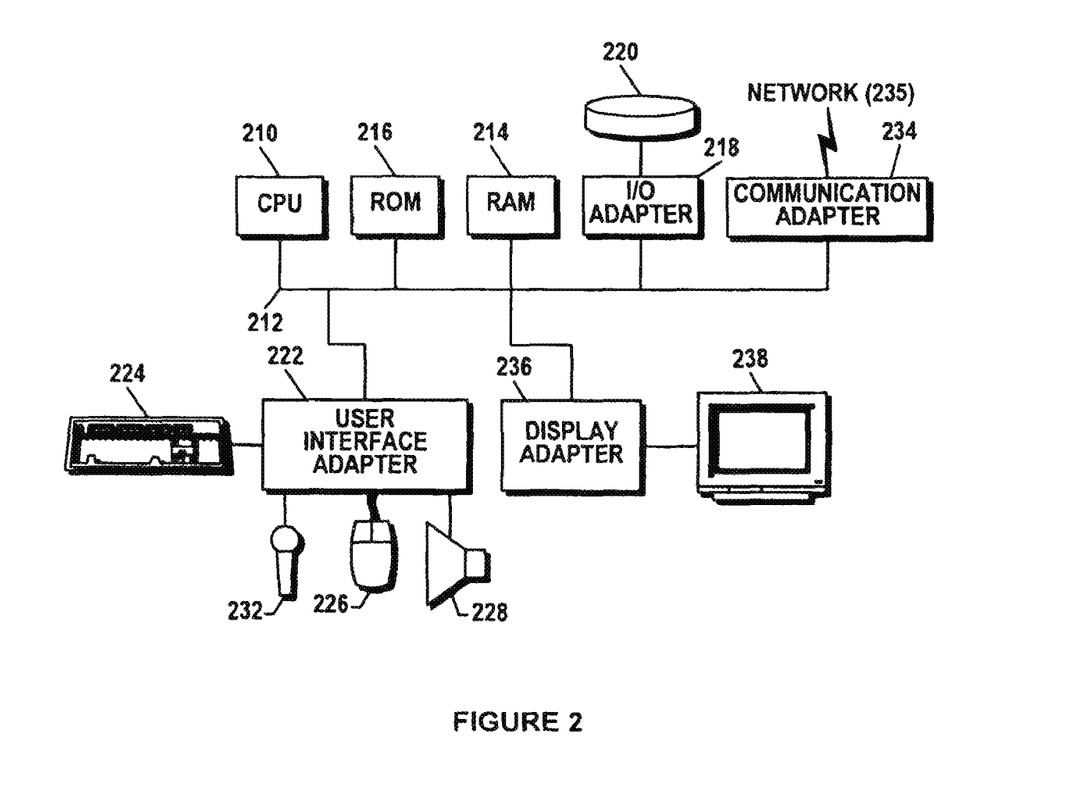
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
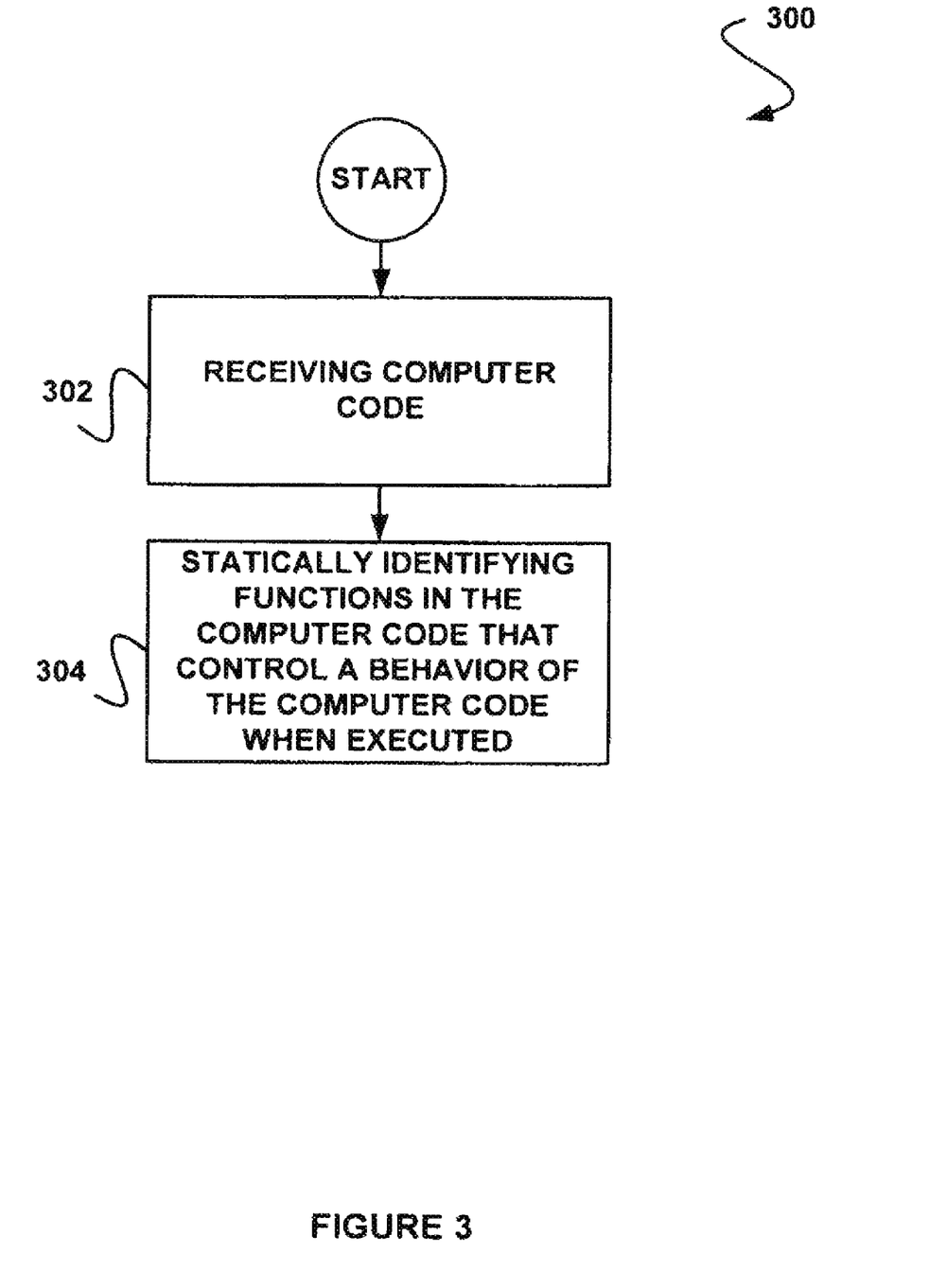
FIG. 3 shows a method for identifying control functions within computer code, in accordance with one embodiment.

FIG. 3 shows a method 300 for identifying control functions within computer code, in accordance with one embodiment. As an option, the method 300 may be implemented in the context of the architecture and environment of FIGS. 1 and/or 2. Of course, however, the method 300 may be carried out in any desired environment.

As shown in operation 302, computer code is received. In the context of the present embodiment, the computer code may include any computer code representative of, at least in part, a plurality of functions. Specifically, in some embodiments, the computer code may include binary computer code (e.g. computer code capable of being disassembled), uncompiled source code, an application, and/or any other type of computer code that is capable, at some point, of being read and/or executed by a computer. Still yet, in other embodiments, the computer code may be capable of being uncompressed, compiled, packed, etc. Furthermore, in the context of still yet other embodiments, the computer code may be read and/or executed by any of the devices and/or component thereof described above with respect to FIGS. 1 and/or 2.

In use, functions in the computer code that control a behavior of the computer code when executed are then statically identified, as shown in operation 304. In the context of the present description, such static identification may refer to any identification of the aforementioned functions that does not necessarily require execution of the computer code. Thus, in one embodiment, the identification of operation 304 may take place without execution of the computer code.

In another embodiment, the identification of operation 304 may optionally further take place during emulation of the computer code (but it is not required). In still another embodiment, the identification of operation 304 may optionally further take place during execution of the computer code (but it is not required).

The above functions (that control a behavior of the computer code) may include any functionality capable of performing a task (or may take any form, for that matter, capable of controlling a behavior of the computer code, etc.). For instance, in some embodiments, the functions may include commands and/or operations. Furthermore, the functions may each optionally return a value (the relevancy of which will be set forth hereinafter in greater detail during description of other embodiments, etc). In use, the functions may be represented by computer code segments within the computer code.

In one optional embodiment, the above functions may be identified by tracing a call flow of the computer code. For instance, a function may be identified by matching a return instruction to an associated call instruction. Of course, the functions may be identified utilizing any desired method capable of identifying functions within computer code.

Furthermore, the functions may control the behavior of the computer code in any particular way. Just by way of example, this may be accomplished by calling other functions, writing to memory, and/or by performing and/or initiating any other tasks within the computer code. Specifically, in one optional embodiment, the functions may control the behavior of the computer code by directly affecting the functionality of the computer code. Thus, in some embodiments, functions relevant to the functionality of the computer code may be identified.

As an option, the functions in the computer code that control a behavior of the computer code may be identified according to a complexity threshold. For instance, functions within the computer code may be assigned a weight according to at least one property associated with each function. Examples of such property(s) will be described in further detail with respect to FIG. 4. In this way, a subset of functions within the computer code that exceed a complexity threshold may be identified as functions that control a behavior of the computer code.

Still yet, identifying the functions may also include extracting the functions from the computer code. For example, such functions may be extracted from the computer code utilizing a disassembler. In another embodiment, the functions may be extracted by searching through computer code for known prologue/epilogue sequences, and/or cross references. Of course, the functions may be extracted from the computer code in any desired manner. In this way, functions that control a behavior of computer code may be identified.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
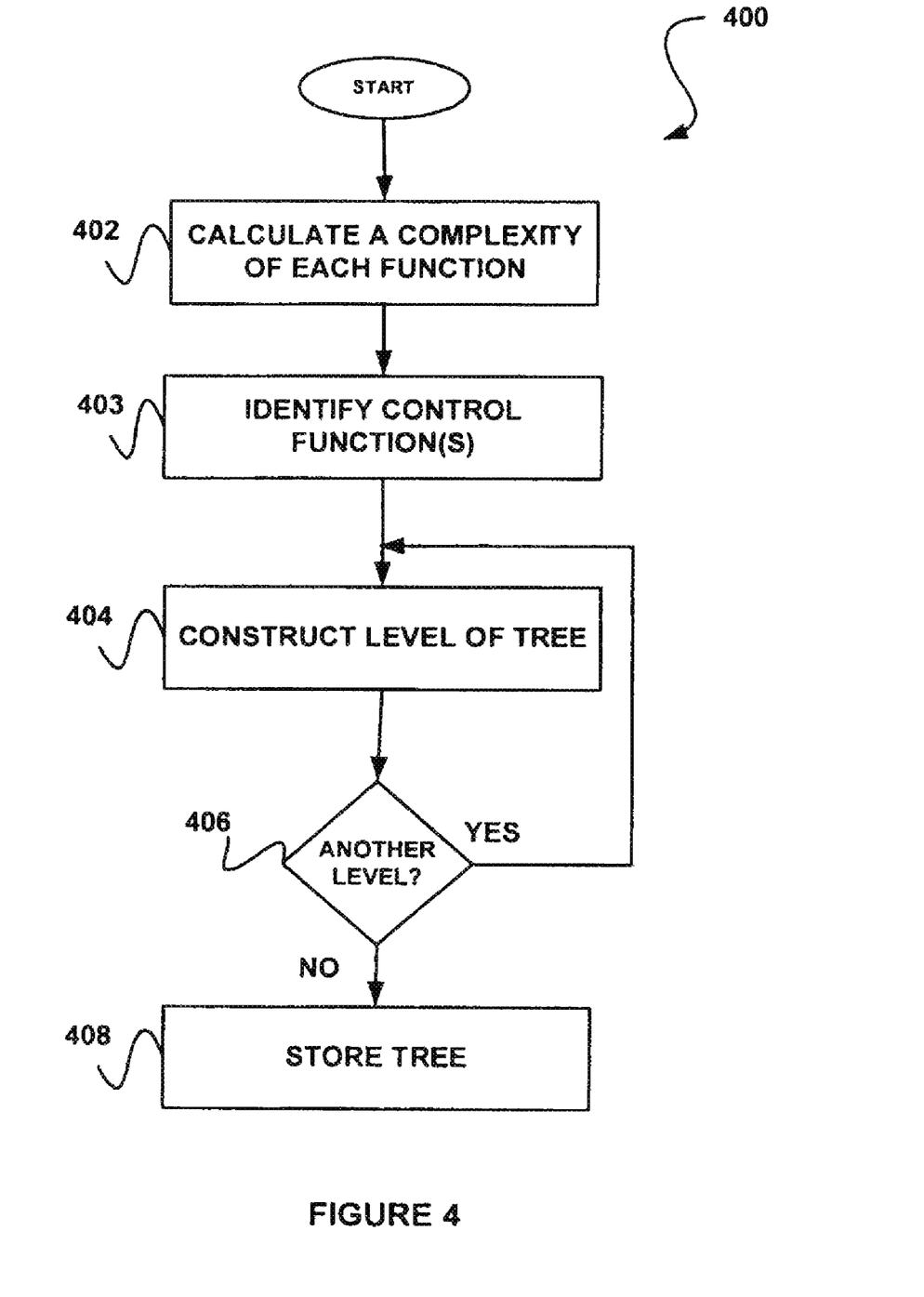
FIG. 4 shows a method for constructing a control function tree from computer code, in accordance with another embodiment.

FIG. 4 shows a method 400 for constructing a control function tree from computer code, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, a complexity of each function is calculated. Each function may include any function that resides within computer code. For example, the functions may include the identified functions described above with respect to FIG. 3. Specifically, such functions may include a subset of functions within computer code that control the behavior of the computer code.

The complexity of each function may then be calculated based on a value of at least one property associated with each function. Furthermore, the complexity may also be based on a number of instances of the at least one property associated with the function. Table 1 illustrates examples of properties that may be utilized in calculating a complexity of a function. Of course, the complexity of each function may be calculated in any desired manner.

TABLE 1

| Function Property | Explanation (if applicable) |
| --- | --- |
| Data Dependent Calls | Far call (e.g. call on a value from a data section; generally a call to an API comes under this category) |
| Outgoing Edges (Option: Minus Near Jumps) | Calls to other functions; the greater number of calls to various functions, the more active the function |
| Number of APIs used | |
| Memory Writes | Signifies write access (e.g. number of times data/code |

TABLE 1-continued

| Function Property | Explanation (if applicable) |
|---|---|
| | section is written); it can cover simple instructions such as instructions including an "OR" command, or complex instructions with self modifying code |
| Data Dependent Jumps | Far jumps (e.g. jump to a value from a data section). |
| Incoming Edges (Option: Minus Near Jumps) | Represents how many times a function or some part of a function is called from another function(s); if the count is high, this can be a library function or a frequently used function |
| Near Jumps | These are the jumps within a function; each jump creates a "label" |
| Memory Reads | Signifies the number of times a data section is read |
| Data Offset Used | Number of times an offset is used instead of a register or a direct value |
| Total Number of Registers Used | |
| Register Used in Memory Reference | Number of registered used in a memory reference (e.g. in instruction "lea edx, [esi + 1]" register esi is used in a memory reference) |
| Stack Modification Instructions | Number of stack modification instructions (e.g. push is +1 and pop is −1); If this number is >0, it signifies stack modification |
| Number of Byte Sequence, Assembly Instruction or Set of Instructions | Number of a byte sequence, an assembly instruction, or a set of instructions that can potentially identify a function |
| Number of Loops | A number of loops in the function |
| Number of Control Functions called in a Loop | |
| Number of Properties within a Loop | A number of properties, such those described herein in Table 1, identified within a loop of the function |
| Checksum | A checksum of the function |
| Size | A size of the function |

Thus, for each function, a total complexity may be calculated based on a sum of property values associated with the function. Furthermore, each property value, as part of the sum, may be multiplied by the number of instances of the property associated with the function.

Table 2 illustrates an exemplary equation that may be used to calculate a complexity of a function. Of course, the equation in Table 2 is set forth for illustrative purposes only. Any desired equation may be used for calculating the complexity of a function.

TABLE 2

Function Properties: P1, P2, P3, P2, P4
Function Complexity: ValP1 + (ValP2*2) + ValP3 + ValP4

As another option, each property may be associated with a specific value. Such values may be predefined or configurable. In one embodiment, operations that are commonly used across all types of computer code (e.g. memory read, memory erase, etc.) may have a lesser complexity value with respect to operations that are more likely to affect the functionality of the computer code (e.g. outgoing edge, etc.). Just by way of example, a value associated with a commonly used function may be less than a value associated with a function called by a function within the computer code. In another embodiment, the value of each property may be based on an importance of the property and/or the extent to which the property uniquely identifies the associated function.

Based on the complexity values calculated in operation 402, a subset of control functions are identified, as shown in operation 403. The control functions may include a subset of the functions in the computer code with the highest total complexity value. Thus, the control functions may include the functions within the computer code whose operations have the greatest effect on the behavior (e.g. functionality, etc.) of the computer code.

The control functions may include any number of functions. As an option, the control functions may be identified based on a total complexity value threshold, such that only functions with total complexity values greater than the threshold are identified as control functions. As another option, the control functions may be identified based on a minimum number of functions called, such that only functions containing up to a threshold number of nested functions are identified as control functions. It should be noted that it is not required that the nested functions be control functions. The aforementioned thresholds may be predefined or configurable. Of course, it should be noted that the control functions may be identified in any desired manner.

In other words, a tree depth may optionally be controlled for each control function. Further, the number of control functions that will be captured may also be configured via runtime parameters.

The control functions are then each utilized to construct a root level of a control tree data structure. See operation 404. For example, if two control functions are identified in operation 403, two control trees may be generated with each control function serving as a root to an associated control tree.

For each control tree, it is then determined whether another level of the control tree exists, as shown in decision 406. The decision may be based on whether an associated control function contains any sub-functions (e.g. outgoing edges, etc.). As an option, such sub-functions may include sub-functions that meet a threshold level of complexity, such as in the manner described above with respect to the process of identifying control functions.

In this way, for each level of sub-functions, any functions with a degree of relationship to the control function may be added to the control tree at an associated level. For instance, a first level may include all functions that are directly called by the control functions (i.e. first degree of relationship), a second level may include all functions that are called by functions located in the first level (i.e. second degree of relationship), and so forth. Thus, each control tree may be constructed based on a functional flow of the computer code. Examples of such control trees will be described in further detail with respect to FIG. 5.

Once it is determined in decision 406 that no further levels of sub-functions exist, the control tree may be stored, as shown in operation 408. The control tree may be stored in memory of the device containing the computer code. Of course, however, the control tree may be stored anywhere capable of providing access to such control tree. In this way, functions that have the greatest affect on the behavior of the computer code may be identified and stored in a data structure along with any sub-functions thereof.

Of course, it should be noted that any data structure may be utilized to store control functions and the sub-functions thereof, along with any other associated data. For instance, any data file may be used to store such information. In particular, an XML file may be used to store functional data associated with computer code, such as any of the calculated complexity values and/or control function identified in operations 402 and 403.

Table 3 illustrates one example of such an XML file.

TABLE 3

```
<?xml version="1.0" encoding="Windows-1252" standalone="yes" ?>
- <File MD5="45 28 BC 37 65 BA 63 57 8D 9D 83 0E 8C 84 44 93">
+ <FunctionNode Id="4013aa" Type="Control">
+ <FunctionNode Id="40135c" Type="Default">
+ <FunctionNode Id="401ca6" Type="Default">
+ <FunctionNode Id="401cc0" Type="Default">
- <FunctionNode Id="401bba" Type="Control">
   <Complexity>123</Complexity>
   <Incoming>1</Incoming>
   <Outgoing>2</Outgoing>
   <API_Used>9</API_Used>
   - <FunctionCallList>
      <APIName>RtlInitUnicodeString</APIName>
      <FunctionName>4012c4</FunctionName>
     <APIName>IoDeleteSymbolicLink</APIName>
     <APIName>IoDeleteDevice</APIName>
     <FunctionName>401332</FunctionName>
     <APTName>IoDeleteSymbolicLink</APTName>
     <APIName>IoDeleteDevice</APIName>
   </FunctionCallList>
```

It should be noted that Table 3 is set forth for illustration only, and should not be construed as limiting in any manner.

As shown, identified control functions, a complexity for each control function, and properties associated with each control function may be provided in an XML file associated with the computer code. Thus, such XML file may be utilized for identifying functions that control a behavior of the computer code when executed. In addition, the XML file may be utilized for identifying the extent to which the identified functions control such behavior.

Figure 5:
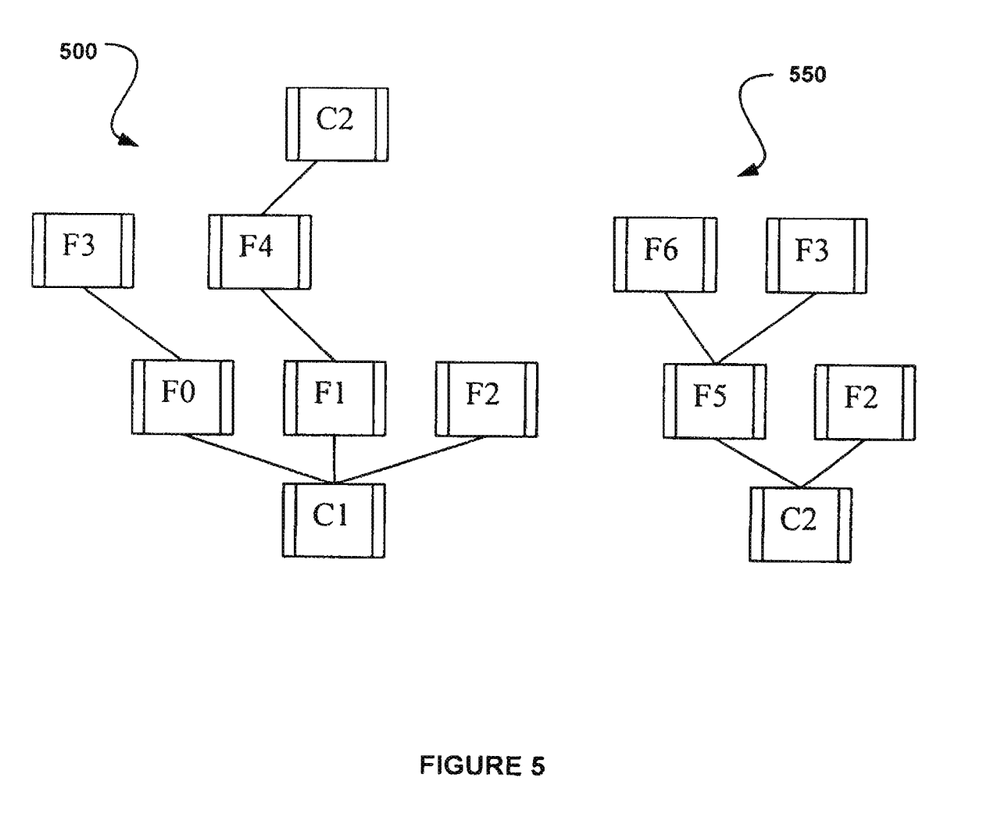
FIG. 5 shows exemplary control function trees, in accordance with yet another embodiment.

FIG. 5 shows exemplary control function trees 500 and 550, in accordance with yet another embodiment. As an option, the control function trees 500 and 550 may be implemented in the context of the architecture and environment of FIGS. 1-4. Of course, however, the control function trees 500 and 550 may be used in any desired environment. It should also be noted that the aforementioned definitions may apply during the present description.

As shown, the first control function tree 500 includes C1 (control function 1) as a root. In addition, the second control function tree 550 includes C2 (control function 2) as a root. Thus, each identified control function associated with computer code is included in a control tree at a root level. As further shown, each sub-function of each identified control function is included in the control tree at an associated leaf/node level. Specifically, each function path located in the control tree may represent a code path capable of existing within the computer code.

As shown in the first control function tree 500, C1 calls functions F0, F1 and F2. Thus, F0, F1 and F2 are placed in the first control tree 500 as nodes located in a first level. Next, F3 is called by F0, and F4 is called by F1, such that F3 and F4 are placed in the first control tree 500 as nodes located in a second level. Still yet, C2 is called by F4, and is therefore placed in the first control tree 500 as a node located in a third level. The second control function tree 550 is created in substantially the same manner as the first control function tree 500.

Figure 6:
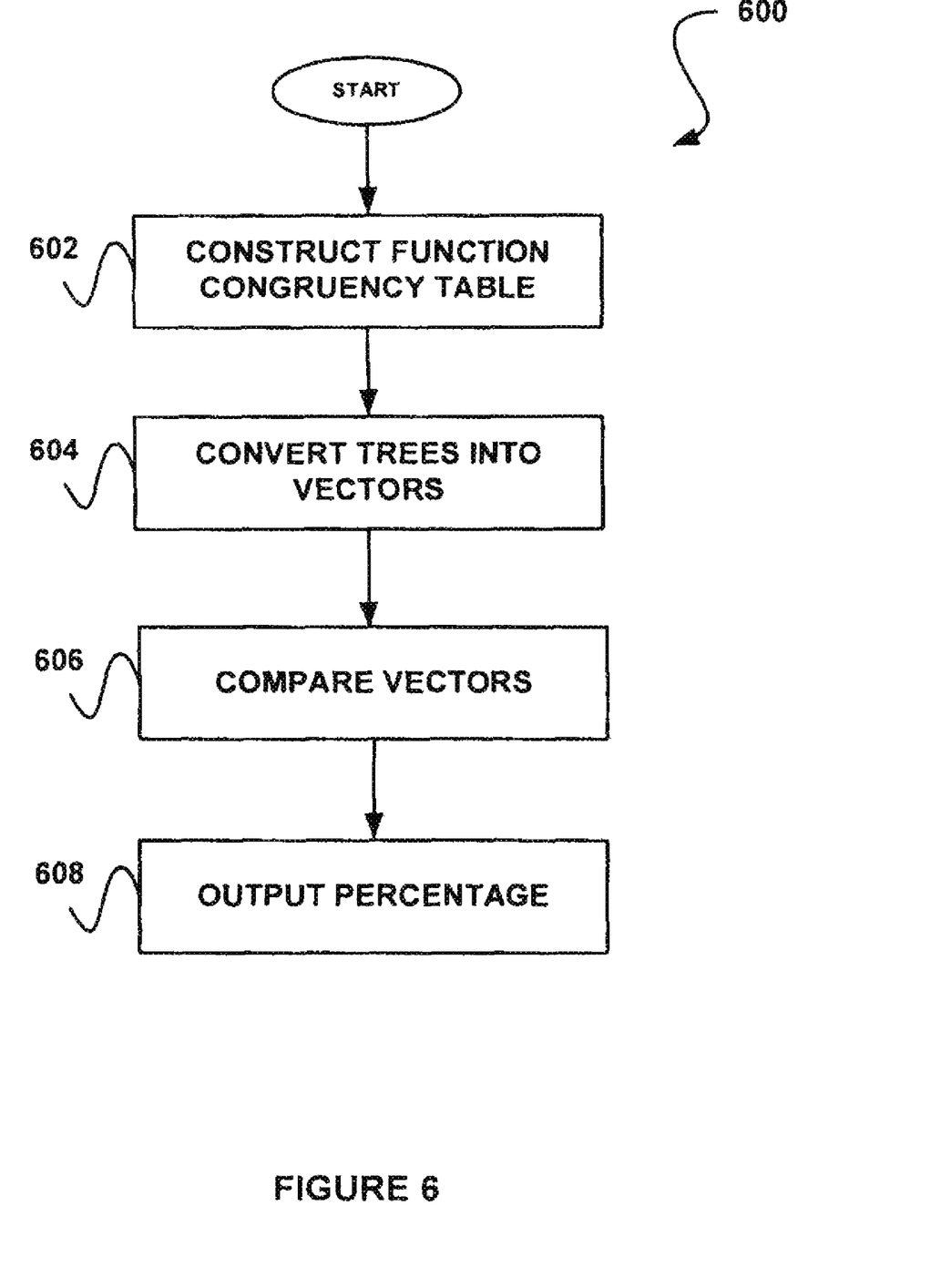
FIG. 6 shows a method for comparing computer code, in accordance with still yet another embodiment.

FIG. 6 shows a method 600 for comparing computer code, in accordance with still yet another embodiment. As an option, the method 600 may be implemented in the context of the architecture and environment of FIGS. 1-5. Of course, however, the method 600 may be carried out in any desired environment. It should also be noted that the aforementioned definitions may apply during the present description.

As shown in operation 602, a function congruency table is constructed. The function congruency table may include all functions within at least two separate sets of computer code. As another option, the function congruency table may include functions located within control trees, such as those described above with respect to FIGS. 4 and/or 5.

A control tree may overlap computer code with another control tree if they are from the same binary. In one embodiment, the function congruency table does not necessarily contain the control tree itself, but rather it has all the functions from the binaries that were captured in all the control trees. Such function congruency table may include any data structure capable of recording a relationship between at least two function sets, each from separate sets of computer code.

The function congruency table may be constructed by matching similar functions between computer codes and creating a map of such matched functions. For instance, properties associated with each function may be evaluated to determine which functions contain similar properties.

A function congruency value (FCV) may then be calculated for each similar pair of functions based on the percentage of similar properties. Thus, functions that are the most similar (e.g. have the function congruency value), in the context of such properties, may be mapped together in the function congruency table. Of course, such function congruency value may also be stored in the function congruency table in association with the mapped functions.

As another option, the functions may be mapped according to complexity and similarity. For instance, if two functions from a first computer code have the same similarity to a function from a second computer code, the function from the first computer code with the greatest complexity may be mapped to the function from the second computer code. In this way, the function congruency value, and therefore the mapping, may be more accurate since the complexity required to create such similarity is greater.

As yet another option, the mapping may be based on a function congruency threshold, such that functions with function congruency values meeting the threshold value may be mapped in the function congruency table. Thus, it may be ensured that the mappings contain at least a predefined function congruency value. If a function is not similar to any other function, such as, for example, in the case where similarities do not meet the function congruency threshold, the function may be stored in the function congruency table without a mapping to any other function.

Once the function congruency table is constructed in operation 602, control trees associated with the first code and the second code are each converted into vectors. Note operation 604. Each vector represents the functional paths, and therefore code paths, capable of being taken by the control tree (and thus the associated control function).

Each vector may be created by traversing an associated control tree from left to right and adding function nodes to the vector at each node. One example of such vectors will be described in further detail with respect to FIG. 7. Of course, any data structure may be utilized that is capable of indicating a functional flow of computer code.

The vectors are then compared, as shown in operation 606. The vectors may be compared by evaluating each node of the vectors for matching sequences and/or matching functions. Table 4 illustrates a table of matching functions and exemplary vectors, such that the above described comparison may be further described in the context of one specific example.

TABLE 4

| Computer Code 01 | Computer Code 02 |
| --- | --- |
| A1 | A2 |
| B1 | B2 |
| C1 | C2 |
| Unmatched functions: X1, Y1 | Unmatched functions: R2, S2 | where,
Unmatched functions = X1, Y1, R2, S2
Vector1 = A1-B1-X1-Y1-B1-C1
Vector 2 = B2-A2-R2-A2-S2-B2-C2-B2

Of course, such example is set forth only by way of illustration, and is not to be construed as limiting in any manner Considering function congruency as shown in Table 4, Vector1 and Vector2 have matching out-of-order functions, namely A1, B1, B2 and A2. In addition, both Vector1 and Vector2 have matching in-order sequences, namely B1, C1, B2 and C2. Specifically, comparing the vectors in operation 606 may include identifying any and/or all of four types of matches, such as in-order sequences, in-order functions, out-of-order sequences, and/or out-of-order functions. Of course, any desired type of matches may be identified.

Order may be determined according to the location of the functions in the vector being matched in association with the traversal of the vector from beginning to end. For example, if a sample Vector1 contains sequence S1 and S2 which each match to a corresponding X1 and X2 in Vector2, but, in Vector2, X1 and X2 are in opposite order, such sequences may be considered out-of-order.

The comparison of operation 606 may therefore allow similarities between two separate computer codes to be evaluated. As an option, order and sequences may be given greater weight than single function matches. In this way, similarities between controlling computer code behavior may be given the greatest weight in determining whether two separate computer codes are, in fact, similar, and potentially a part of the same class of computer code.

In one embodiment, each different match type may be assigned a value, such as in the manner described above. Of course, the values may be defined in any desired manner. In addition, by modifying the values of the different match types, different types of similarities may be emphasized. For example, if all of the values are of the same value, the emphasis may be on computer code similarity irrespective of logic.

Once the vectors have been compared in operation 606, a code similarity value may be output, as shown in operation 608. The code similarity value may represent the amount of matching logic and/or code between two computer codes. In particular, the code similarity value may be calculated using a function congruency value from the function congruency table as a multiplier to the associated vector match values. In this way, the function congruency value may be utilized to normalize any match values, such that the code similarity value may represent the percentage of a total match between any functions and/or function sequences. In one embodiment, the code similarity value may be calculated as a percentage.

Just by way of example, referring to the exemplary vectors in Table 4, if functions B1 and C1 had a function congruency value of 75% to B2 and C2 respectively, the total score for the matching in-order sequence value may be adjusted by 75% (e.g. assuming the matching in-order sequence value was 1, the total score for the matching sequence order may be equal to: 1×0.75+1×0.75). The code similarity value may then be calculated based on the fraction of the total value and a maximum possible value. Of course, it should be noted that the code similarity value could be calculated in any desired manner. As an option, the code similarity value may be stored in a table with the associated matching functions and/or sequences.

Thus, a method is provided for comparing computer codes utilizing the functions within the computer codes and their associated properties. Furthermore, the method is capable of making comparisons based on a percentage of similarities between the functions within the computer codes. Still yet, the method outputs matching results, where the matching results take into account such function congruency values, such that a match percentage reflects the actual similarity of the functions, and therefore the actual similarity of the computer code.

In one optional embodiment, computer code may be compared against computer code known to contain undesirable code (e.g. viruses, malware, Trojans, worms, spyware, adware, etc.), and such computer code may be identified as containing undesirable code based on a percentage match associated therewith. Specifically, the identification may be based on the functionality and/or behavior of the computer code. In this way, structural modifications made to the computer code may not necessarily interfere with determining whether the computer code contains undesirable code. Still yet, specific functions within the computer code may be matched to functions known to contain undesirable code, thus allowing a specific identification of the undesirable code within the computer code.

In another optional embodiment, this may be used to identify specific pieces of computer code, functions, and function sequences which represent a family or classification of undesirable code. Furthermore, this computer code can be used to identify heuristically that the code being evaluated is, in fact, undesirable and of a particular same classification/family.

In one example, an identification that computer code contains undesirable code may be based on a threshold match percentage, such that only matches of a predetermined threshold may be considered to be actual matches. In another optional embodiment, computer code may be compared against computer code of a known class, such that a class of the computer code may be determined.

Figure 7:
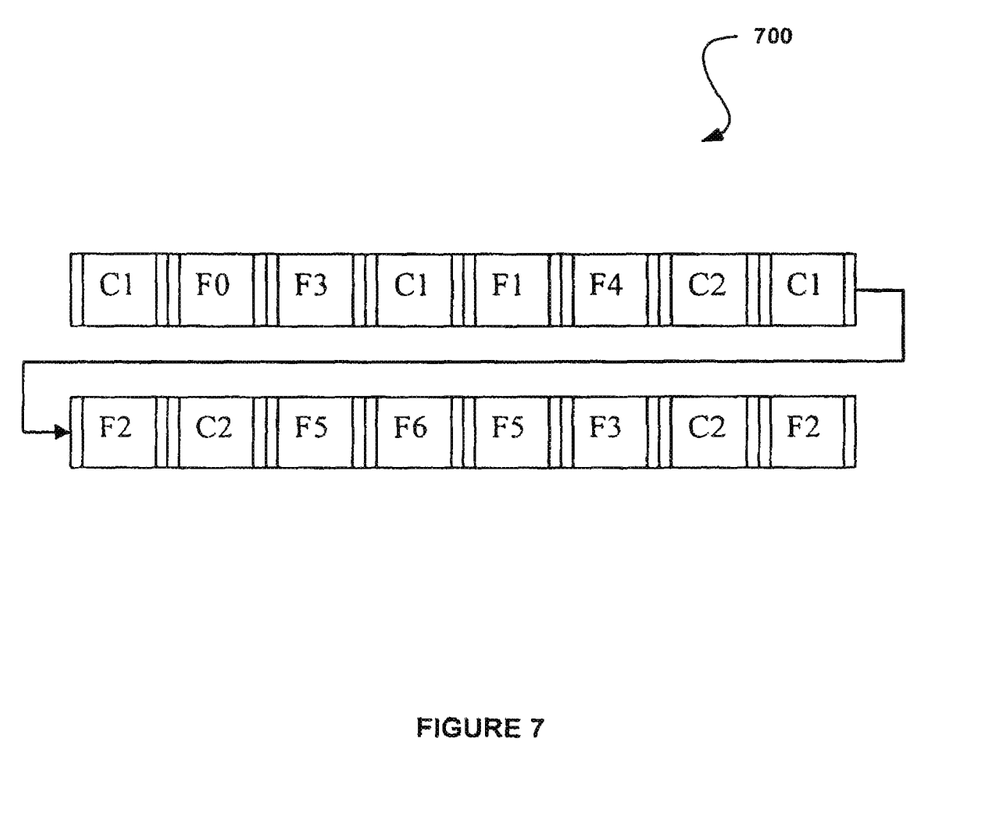
FIG. 7 shows an exemplary control function vector, in accordance with another embodiment.

FIG. 7 shows an exemplary control function vector 700, in accordance with another embodiment. As an option, the control function vector 700 may be implemented in the context of the architecture and environment of FIGS. 1-6. Of course, however, the control function vector 700 may be used in any desired environment. It should also be noted that the aforementioned definitions may apply during the present description.

As shown, the control function vector 700 is a data structure that contains data associated with functions within computer code. Specifically, the control function vector 700 includes all functional flow paths capable of being taken by identified control functions. In the present example, the control function vector 700 may be associated with control function trees.

For illustration purposes only, the control function vector 700 may correspond to the control function trees described above with respect to FIG. 5. Of course, the control function vector 700 may be associated with any data structure that includes information associated with functions in the computer code.

The control function vector 700 contains a first element which is a first control function identified from the computer (i.e. a root of a first control function tree). Function flows are inserted into the control function vector 700 such that the control function vector 700 contains sub-functions of the first control function. As shown, a first function flow inserted into the control function vector 700 is C1-F0-F3. Such first function flow may correspond to a path located in the first control function tree. In substantially the same manner, subsequent function flows associated with the control function are inserted into the control vector function. The process then repeats for each control function.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into computing/networking systems of the foregoing potential targets, terrorism may be countered by classifying computer code and/or identifying computer code as including malware, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   identifying, in a first computer code, control functions that control behavior, wherein the identifying is performed in conjunction with a processor configured to identify particular functions in the first computer code that exceed a complexity threshold;
   creating a first vector associated with at least one of the control functions;
   comparing the first vector and a second vector associated with a second computer code, which is associated with undesirable code; and
   identifying a similarity between the first computer code and the second computer code based on the comparing of the first vector and the second vector.

2. The method of claim 1, further comprising:
   generating a code similarity value associated with comparing the first computer code and the second computer code.

3. The method of claim 2, wherein a metric that is associated with a function congruency table, which reflects similarities between the first and the second computer code, serves as a multiplier to the code similarity value for generating an output.

4. The method of claim 1, wherein identifying the control functions comprises:
   calculating a complexity value for each function in the first computer code based on a value of at least one property associated with each function; and
   identifying each function having a complexity value that exceeds the complexity threshold.

5. The method of claim 1, wherein identifying the control functions comprises:
   calculating a complexity value for each function in the first computer code based on a number of instances of at least one property associated with each function; and
   identifying each function as one of the control functions if the complexity value exceeds the complexity threshold.

6. The method of claim 1, wherein identifying the control functions comprises:
   calculating a complexity value for each function in the first computer code based on a sum of property values associated with each function; and
   identifying each function having a complexity value that exceeds the complexity threshold.

7. The method of claim 1, wherein identifying the control functions comprises:
   calculating a complexity value for each function in the first computer code based on a sum of property values associated with each function, wherein the property values are based on the extent to which the property values uniquely identify each function; and
   identifying each function having a complexity value that exceeds the complexity threshold.

8. The method of claim 1, wherein identifying the control functions is based on a number of functions called by segments of the first computer code.

9. The method of claim 1, further comprising:
   creating a tree data structure having at least one of the control functions; and
   converting the tree data structure into a plurality of vectors.

10. The method claim 1, wherein identifying the control functions comprises tracing a call flow of the first computer code.

11. The method of claim 1, wherein comparing the first vector to the second vector comprises identifying a percentage of similar properties between the first computer code and the second computer code.

12. The method of claim 1, further comprising:
   identifying a complexity characteristic associated with the control functions; and
   identifying a subset of the control functions having a highest total complexity value.

13. The method of claim 1, wherein comparing the first vector to the second vector comprises mapping at least one of the control functions based on a function congruency value that exceeds a function congruency threshold.

14. The method of claim 1, wherein comparing the first vector to the second vector comprises mapping the control functions based on a complexity characteristic and a similarity characteristic of the control functions.

15. The method of claim 1, wherein comparing the first vector to the second vector comprises comparing in-order sequences, in-order functions, out-of-order sequences, and out-of-order functions.

16. The method of claim 1, wherein the first vector is part of a control tree generated for each of the control functions.

17. The method of claim 1, further comprising:
generating a function congruency table reflective of a comparison between the first computer code and the second computer code.

18. The method of claim 1, wherein the control functions are identified during emulation of the first computer code.

19. The method of claim 1, wherein the first computer code is received as part of network traffic propagating in a network environment.

* * * * *